(12) United States Patent
Tajima et al.

(10) Patent No.: US 9,640,831 B2
(45) Date of Patent: May 2, 2017

(54) ELECTRONIC DEVICE WITH SECONDARY BATTERY

(71) Applicant: Semiconductor Energy Laboratory Co., LTD., Atsugi-shi, Kanagawa-ken (JP)

(72) Inventors: Ryota Tajima, Kanagawa (JP); Minoru Takahashi, Nagano (JP); Junya Goto, Kanagawa (JP); Takuya Miwa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/710,005

(22) Filed: May 12, 2015

(65) Prior Publication Data
US 2015/0333360 A1    Nov. 19, 2015

(30) Foreign Application Priority Data

May 16, 2014    (JP) .................................. 2014-102895

(51) Int. Cl.
*H01M 10/04* (2006.01)
*H01M 2/18* (2006.01)
(Continued)

(52) U.S. Cl.
CPC ......... *H01M 10/0436* (2013.01); *H01M 2/18* (2013.01); *H01M 4/13* (2013.01);
(Continued)

(58) Field of Classification Search
CPC ......... H01M 10/0436; H01M 2220/30; H01M 2/18; H01M 10/052; H01M 10/058
See application file for complete search history.

(56) References Cited

U.S. PATENT DOCUMENTS

| 5,339,091 A | 8/1994 | Yamazaki et al. |
| 5,475,398 A | 12/1995 | Yamazaki et al. |

(Continued)

FOREIGN PATENT DOCUMENTS

| EP | 2660892 A | 11/2013 |
| EP | 2806492 A | 11/2014 |

(Continued)

OTHER PUBLICATIONS

International Search Report (Application No. PCT/IB2015/053257) Dated Aug. 18, 2015.

(Continued)

*Primary Examiner* — Emily Le
*Assistant Examiner* — Monique Wills
(74) *Attorney, Agent, or Firm* — Nixon Peabody LLP; Jeffrey L. Costellia (57) ABSTRACT

In the case where a film, which has lower strength than a metal can, is used as an exterior body of a secondary battery, a current collector provided in a region surrounded by the exterior body, an active material layer provided on a surface of the current collector, or the like might be damaged when force is externally applied to the secondary battery. A secondary battery that is durable even when force is externally applied thereto is provided. A region that is easily partly bent and a region that is not easily partly bent owing to a protective material provided in the region are intentionally formed to obtain the durable secondary battery.

10 Claims, 6 Drawing Sheets

(51) Int. Cl.
*H01M 10/058* (2010.01)
*H01M 4/13* (2010.01)
*H01M 10/052* (2010.01)
*H01M 2/26* (2006.01)

(52) U.S. Cl.
CPC ....... *H01M 10/052* (2013.01); *H01M 10/058* (2013.01); *H01M 2/26* (2013.01); *H01M 2220/30* (2013.01)

(56) References Cited

U.S. PATENT DOCUMENTS

| | | | |
|---|---|---|---|
| 7,864,151 | B1 | 1/2011 | Yamazaki et al. |
| 8,040,456 | B2 | 10/2011 | Yamazaki et al. |
| 8,218,105 | B2 | 7/2012 | Yamazaki et al. |
| 8,319,725 | B2 | 11/2012 | Okamoto et al. |
| 8,367,440 | B2 | 2/2013 | Takayama et al. |
| 8,415,208 | B2 | 4/2013 | Takayama et al. |
| 8,427,420 | B2 | 4/2013 | Yamazaki et al. |
| 8,634,041 | B2 | 1/2014 | Yamazaki et al. |
| 8,884,845 | B2 | 11/2014 | Yamazaki et al. |
| 8,929,085 | B2 | 1/2015 | Franklin et al. |
| 2005/0174302 | A1 | 8/2005 | Ishii |
| 2005/0189906 | A1 | 9/2005 | Sun |
| 2008/0002527 | A1 | 1/2008 | Ishii et al. |
| 2009/0071952 | A1 | 3/2009 | Kuwabara |
| 2009/0186270 | A1* | 7/2009 | Harada ............... H01M 2/0267 429/185 |
| 2010/0068628 | A1* | 3/2010 | Ueda ..................... H01M 4/40 429/304 |
| 2010/0239907 | A1 | 9/2010 | Izumi |
| 2012/0244408 | A1 | 9/2012 | Huang et al. |
| 2013/0083496 | A1 | 4/2013 | Franklin et al. |
| 2013/0100392 | A1 | 4/2013 | Fukushima |
| 2013/0224562 | A1 | 8/2013 | Momo |
| 2013/0252065 | A1 | 9/2013 | Ueda |
| 2013/0273405 | A1 | 10/2013 | Takahashi et al. |
| 2013/0284531 | A1 | 10/2013 | Oonuma et al. |
| 2014/0352140 | A1 | 12/2014 | Tasaki et al. |
| 2015/0022957 | A1 | 1/2015 | Hiroki et al. |
| 2015/0078588 | A1 | 3/2015 | Umehara et al. |
| 2015/0086860 | A1 | 3/2015 | Yokoi et al. |
| 2015/0111088 | A1 | 4/2015 | Hiroki et al. |
| 2015/0116920 | A1 | 4/2015 | Franklin et al. |
| 2015/0243962 | A1 | 8/2015 | Hiroki et al. |
| 2015/0261254 | A1 | 9/2015 | Hiroki et al. |
| 2015/0333359 | A1 | 11/2015 | Takahashi et al. |

FOREIGN PATENT DOCUMENTS

| | | |
|---|---|---|
| JP | 63-015796 | 1/1988 |
| JP | 11-154495 A | 6/1999 |
| JP | 2000-285904 A | 10/2000 |
| JP | 2001-052762 A | 2/2001 |
| JP | 2011-060576 A | 3/2011 |
| JP | 2012-142144 A | 7/2012 |
| JP | 2012-234670 A | 11/2012 |
| JP | 2013-145678 A | 7/2013 |
| JP | 2013-149521 A | 8/2013 |
| JP | 2013-239435 A | 11/2013 |
| WO | WO-2012/090652 | 7/2012 |
| WO | WO-2013/108708 | 7/2013 |

OTHER PUBLICATIONS

Written Opinion (Application No. PCT/IB2015/053257) Dated Aug. 18, 2015.

* cited by examiner

ELECTRONIC DEVICE WITH SECONDARY BATTERY

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification mean all devices including secondary batteries, and electro-optical devices including secondary batteries, information terminal devices including secondary batteries, and the like are all electronic devices.

BACKGROUND ART

Portable electronic devices and wearable electronic devices are under active development. For example, a thin portable electronic book is disclosed in Patent Document 1.

Portable electronic devices and wearable electronic devices operate using batteries as power sources. Portable electronic devices need to withstand extended use and thus can incorporate high-capacity secondary batteries. In that case, there occurs a problem that the size and weight of the electronic devices are large. In view of this problem, a small and thin high-capacity secondary battery that can be incorporated in a portable electronic device is under development.

Metal cans are used as exterior bodies of secondary batteries, and electrolytes and the like are contained in the metal cans.

REFERENCE

[Patent Document 1] Japanese Published Patent Application No. S63-15796

DISCLOSURE OF INVENTION

A metal can used as an exterior body has a problem of increasing the weight of a secondary battery. Moreover, it is difficult to manufacture a thin metal can by molding and fabricate a secondary battery using a thin metal can, in order to obtain a thin secondary battery.

The use of a film (also referred to as a laminate film) including a stack of metal foil (e.g., aluminum foil or stainless steel foil) and a resin (heat-seal resin) as an exterior body allows fabrication of a secondary battery that is thinner and more lightweight than a secondary battery using a metal can. An object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

In the case where a film, which has lower strength than a metal can, is used as an exterior body of a secondary battery, a current collector provided in the exterior body, an active material layer provided on a surface of the current collector, or the like might be damaged when force is externally applied to the secondary battery. The current collector includes a projection (also referred to as an electrode tab portion) for connection to a lead electrode. When the secondary battery is bent by external force, part of the current collector suffers damage such as a crack in the vicinity of the projection (electrode tab portion), leading to breakage of the secondary battery. Note that the electrode tab portion is not provided with an active material layer.

A thin secondary battery using a laminate film for its exterior body has an electrode shape that is likely to be cracked. That is, an electrode in the thin secondary battery includes a projection (electrode tab portion) for leading a lead electrode. When the fabricated thin secondary battery is bent, external force focuses on and is applied to a portion that is susceptible to bending damage, so that the thin secondary battery is damaged. To reinforce the portion susceptible to bending damage, a protective material is provided in the secondary battery.

A portion susceptible to bending damage in a secondary battery is a portion around a projection (electrode tab portion) of a current collector, that is, a portion in which the width of the current collector is greatly different from the other portion. The current collector is thin metal foil, and might be cracked or broken by external force.

In view of the above, a protective material is provided so as to overlap with the portion in which the width of the current collector is greatly different from the other portion, in order to prevent the portion from being significantly bent and protect the portion.

In other words, a region that is easily partly bent and a region that is not easily partly bent owing to a protective material provided in the region are intentionally formed to obtain a durable secondary battery.

One embodiment disclosed in this specification is a secondary battery with a film. The secondary battery includes a first current collector, a first active material layer, a second current collector, a second active material layer, and a protective material in a region surrounded by the film. The first current collector and the second current collector partly overlap with each other. The first current collector and the protective material partly overlap with each other. The first current collector includes a first region in contact with the first active material layer, and a second region projecting from an end face of the first active material layer. The second current collector includes a third region in contact with the second active material layer, and a fourth region projecting from an end face of the second active material layer. The protective material overlaps with at least the second region.

In the above structure, the protective material overlaps with at least the fourth region. Furthermore, in the above structure, the protective material partly overlaps with the first active material layer. Furthermore, in the above structure, the protective material partly overlaps with the second active material layer.

Another embodiment disclosed in this specification is a secondary battery with a film that includes a first current collector, a first active material layer, a second current collector, a second active material layer, a first protective material, and a second protective material in a region surrounded by the film. The first current collector and the second current collector partly overlap with each other. The first protective material and the second protective material partly overlap with each other.

In the above structure, the first current collector includes a first region in contact with the first active material layer, and a second region projecting from an end face of the first active material layer. The second current collector includes a third region in contact with the second active material layer, and a fourth region projecting from an end face of the second active material layer. The second region is located between the first protective material and the second protective material.

In each of the above structures, the first protective material overlaps with the boundary between the first region and the second region.

In each of the above structures, the first protective material overlaps with the boundary between the third region and the fourth region.

To increase the capacity of a secondary battery, a plurality of units each including at least a positive electrode current collector, a separator, and a negative electrode current collector are stacked in a region surrounded by an exterior body. Note that a protective material is provided between the exterior body and the outermost current collector. The protective material has a thickness larger than that of the separator and that of the current collector. Furthermore, the protective material may be formed using the same material as that for the separator so as to have a rolled-sheet shape.

Examples of the shape of the protective material include a flat plate shape, a bar-like shape, and a rectangular solid shape. For example, a sheet-like plastic film with slits may be employed. Furthermore, a plurality of protective materials may be provided in a region surrounded by an exterior body. The materials may have different sizes and shapes. For example, an aggregate including bound multiple fiber threads (glass fiber) may be used as the protective material. Alternatively, an aggregate (weave) including organic resin threads woven like a cloth may be used. Furthermore, a sheet-like material that is rolled or folded may be used. Specifically, the protective material (plastic film) with a thin plate-like shape the area of which is larger than that of the current collector is provided in the region surrounded by the exterior body, so as to overlap with the current collector.

A material of the protective material is preferably an insulator (e.g., plastic, rubber (natural rubber or synthetic rubber), glass, nonwoven fabric, or paper). In particular, a material of the protective material is preferably rubber (e.g., synthetic rubber such as silicone rubber, fluorine rubber, chloroprene rubber, nitrile-butadiene rubber, ethylene-propylene rubber, or styrene-butadiene rubber). Specifically, a material having a larger elastic modulus than the separator is used as a material of the protective material. Alternatively, a porous material including air bubbles (e.g., sheet-like styrofoam or sponge rubber formed using any of the synthetic rubber materials listed above) may be used as a material of the protective material. A gelled material may be used as a material of the protective material.

Alternatively, a conductive material that has an insulating surface can be used as a material of the protective material. Examples of a material of the protective material include carbon fiber whose surface is coated with an organic resin; metal foil (e.g., aluminum foil, copper foil, or stainless steel foil) having a surface over which an inorganic insulating film such as a silicon oxide film is formed; and metal foil whose surface is coated with an organic resin.

The protective material provided in the region surrounded by the exterior body in a secondary battery allows the current collector and the like to be stably positioned. When the secondary battery is bent to have a desired form, the protective material can also be bent to some degree so that the secondary battery can have the desired form, contributing to maintaining of the bent form of the secondary battery. Furthermore, a restricting function of preventing the secondary battery from being bent more than necessary may be provided. The protective material can also serve as a framework of the secondary battery.

The protective material is not necessarily provided in the region surrounded by the exterior body, and may be provided so as to be partly exposed. In that case, the protective material itself serves as part of the exterior body, that is, a sealing material.

Another embodiment of the present invention is a power storage unit including a plurality of first current collectors for positive electrodes and second current collectors for negative electrodes in a region surrounded by an exterior body.

The power storage unit of one embodiment of the present invention can change its form with a curvature radius of greater than or equal to 10 mm, preferably greater than or equal to 30 mm. One or two films are used as the exterior body of the power storage unit. In the case where the power storage unit has a layered structure, the power storage unit has a cross section sandwiched by two curves of the film(s) when bent.

Figure 5A:
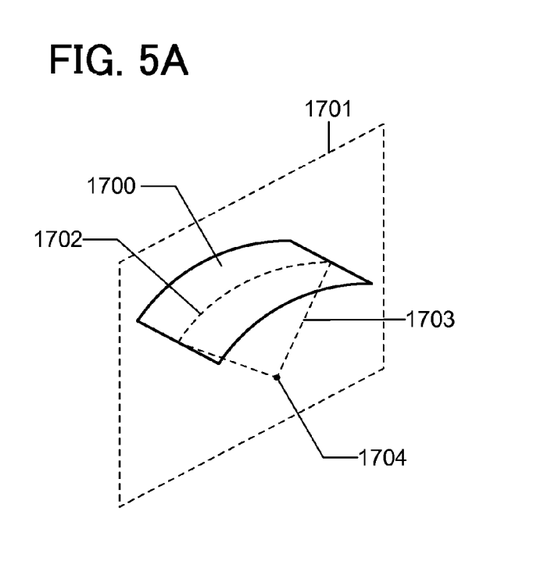
FIGS. 5A to 5C illustrate a radius of curvature of a surface.
Figure 5B:
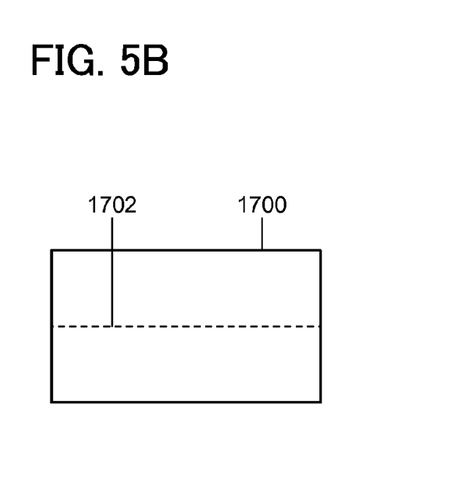
Figure 5C:
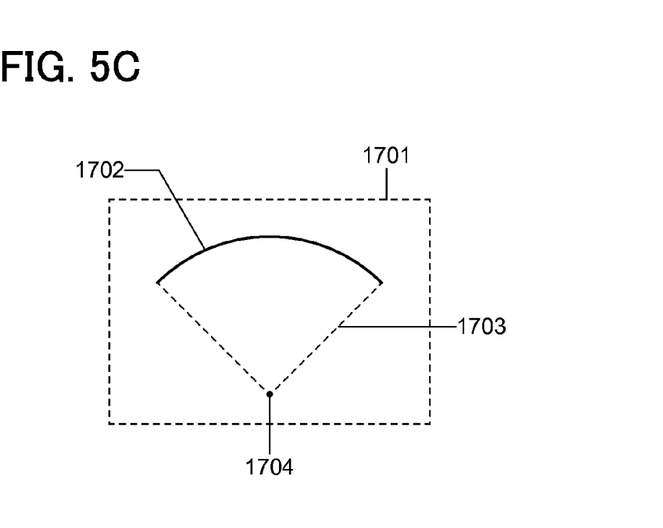

Description is given of the curvature radius of a surface with reference to FIGS. 5A to 5C. In FIG. 5A, on a plane 1701 along which a curved surface 1700 is cut, part of a curve 1702 forming the curved surface 1700 is approximate to an arc of a circle, and the radius of the circle is referred to as a radius 1703 of curvature and the center of the circle is referred to as a center 1704 of curvature. FIG. 5B is a top view of the curved surface 1700. FIG. 5C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 6A:
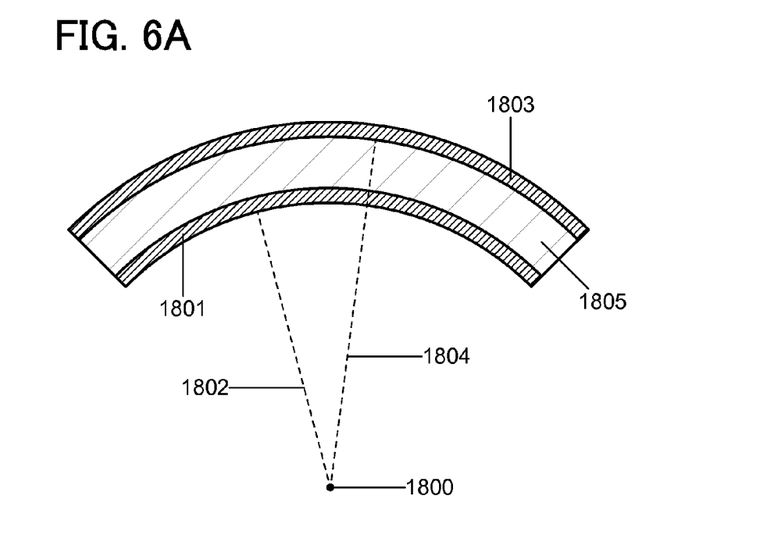
FIGS. 6A to 6D illustrate cross sections of a power storage unit.
Figure 6B:
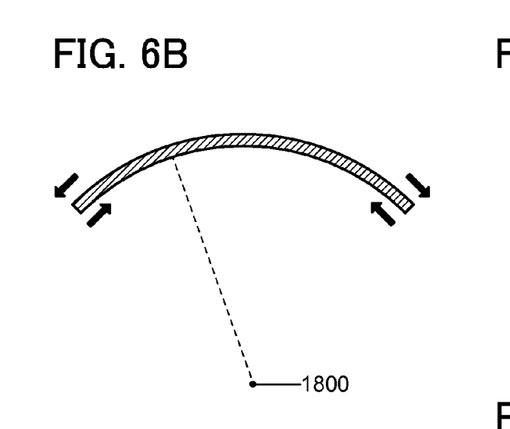

In the case of bending a power storage unit in which a component 1805 including electrodes and an electrolytic solution is sandwiched between two films as exterior bodies, a radius 1802 of curvature of a film 1801 close to a center 1800 of curvature of the power storage unit is smaller than a radius 1804 of curvature of a film 1803 far from the center 1800 of curvature (FIG. 6A). When the power storage unit is curved and has an arc-shaped cross section, compressive stress is applied to a surface of the film on the side closer to the center 1800 of curvature and tensile stress is applied to a surface of the film on the side farther from the center 1800 of curvature (FIG. 6B). However, by forming a pattern including projections or depressions on surfaces of the exterior bodies, the influence of a strain can be reduced to be acceptable even when compressive stress and tensile stress are applied. For this reason, the power storage unit can change its form such that the exterior body on the side closer to the center of curvature has a curvature radius greater than or equal to 10 mm, preferably greater than or equal to 30 mm.

Figure 6C:
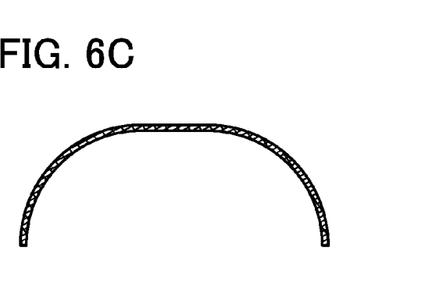
Figure 6D:
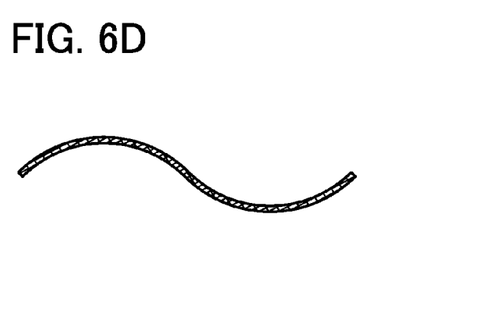

Note that the cross-sectional shape of the power storage unit is not limited to a simple arc shape, and the cross section can be partly arc-shaped; for example, a shape illustrated in FIG. 6C, a wavy shape illustrated in FIG. 6D, or an S shape can be used. When the curved surface of the power storage unit has a shape with a plurality of centers of curvature, the power storage unit can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

One embodiment of the present invention can be used for various power storage devices. Examples of such power storage devices include a battery, a primary battery, a secondary battery, a lithium-ion secondary battery (including a lithium-ion polymer secondary battery), and a lithium air battery. In addition, a capacitor is given as another example of the power storage devices. For example, with a combination of the negative electrode of one embodiment of the present invention and an electric double layer positive electrode, a capacitor such as a lithium-ion capacitor can be fabricated.

The degree of change in form of a secondary battery due to external force, that is, a change in part of an internal structure of the secondary battery due to external force can be adjusted by a material or the position of a protective material. For example, the protective material can suppress sharp bending so that the internal structure of the secondary battery is not broken. Thus, the protective material can protect the internal structure from being damaged by external bending force. Furthermore, a novel power storage device, a novel secondary battery, or the like can be provided. Note that the description of these effects does not disturb the existence of other effects. One embodiment of the present invention does not necessarily have all the effects listed above. Other effects will be apparent from and can be derived from the description of the specification, the drawings, the claims, and the like.

BEST MODE FOR CARRYING OUT THE INVENTION

Embodiments of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments.

Note that in each drawing referred to in this specification, the size or the layer thickness of each component is exaggerated or a region of each component is omitted for clarity of the invention in some cases. Therefore, embodiments of the present invention are not limited to such a scale.

Note that ordinal numbers such as "first" and "second" in this specification and the like are used in order to avoid confusion among components and do not denote the priority or the order such as the order of steps or the stacking order. A term without an ordinal number in this specification and the like is provided with an ordinal number in a claim in some cases in order to avoid confusion among components.

Embodiment 1

Figure 1A:
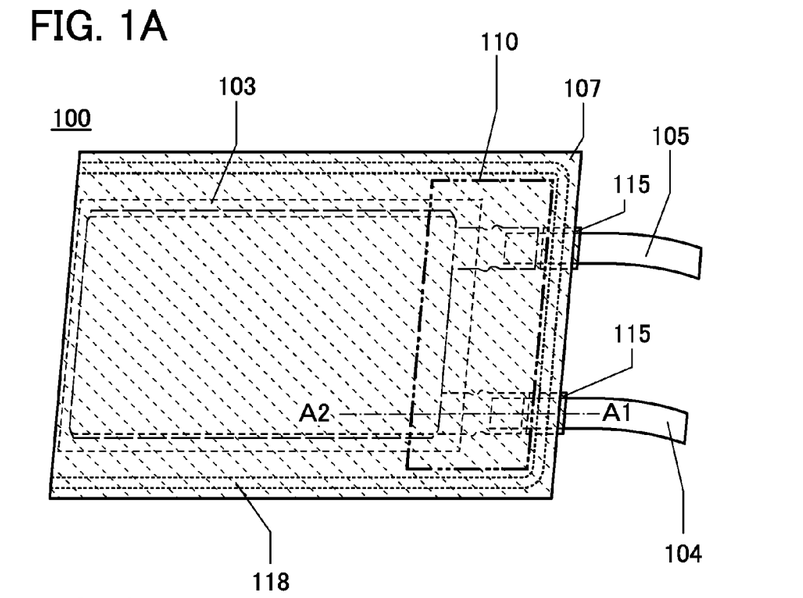
FIGS. 1A to 1C are a schematic external view and cross-sectional views illustrating an embodiment of the present invention.
Figure 1B:
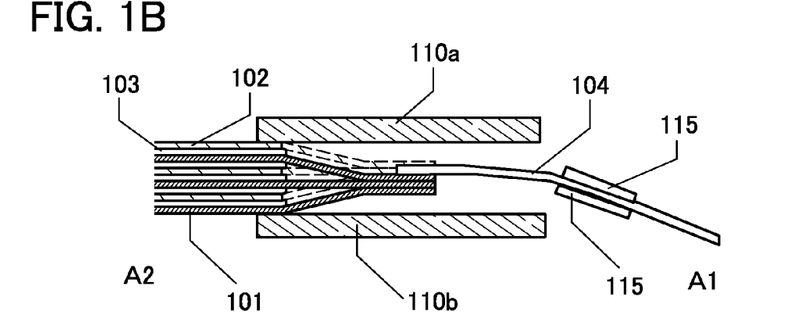

FIG. 1A illustrates an example of a schematic view of a power storage unit 100. FIG. 1B illustrates an example of an internal structure surrounded by an exterior body of the power storage unit.

The power storage unit 100 of one embodiment of the present invention includes at least a positive electrode 101, a separator 103, a negative electrode 102, a protective material 110, and an electrolytic solution in an exterior body 107. The power storage unit can have any of a variety of structures, and a film is used for formation of the exterior body 107 in this embodiment. Thermocompression bonding or the like using, for example, a heating bar is performed on the outer edge of the exterior body 107, whereby the positive electrode 101, the negative electrode 102, the protective material 110, the separator 103, the electrolytic solution, and the like are sealed by a compression bonding region 118.

A film used to form the exterior body 107 is a single-layer film selected from a metal film (a film of a metal in the form of foil, such as aluminum, stainless steel, nickel steel, gold, silver, copper, titanium, nichrome, iron, tin, tantalum, niobium, molybdenum, zirconium, or zinc or an alloy thereof), a plastic film made of an organic material, a hybrid material film containing an organic material (e.g., an organic resin or fiber) and an inorganic material (e.g., ceramic), and a carbon-containing film (e.g., a carbon film or a graphite film); or a layered film including two or more of the above films.

In this embodiment, two sheet-like plastic films are used as the protective material 110 to protect projections of the positive electrode and the negative electrode. When the protective material 110 is provided in a region shown by chain lines in FIG. 1A, the region is not easily bent. An interstitial material (a supporting material; e.g., a resin) may be provided between the two sheet-like plastic films and fixed. Alternatively, a resin material with a bar structure in which a bar is provided between flat plates may be formed as the protective material 110 using a metal mold, a three-dimensional modeling device (also called a 3D printer), or the like. In this embodiment, a plastic film having a larger thickness than the separator 103 is used as the protective material 110. The protective material 110 may be provided with slits. The shape of the protective material 110 is not limited to a rectangle and may be a shape with four round angles. If the shape of the protective material 110 has an acute angle, when the power storage unit is bent, the angle might damage the film serving as the exterior body. Thus, angles of the protective material 110 are chamfered, so that the power storage unit can have high reliability. An insulating material is used as a material of the protective material 110; for example, PP, PE, polyester such as PET or PBT, polyamide such as nylon 6 or nylon 66, an inorganic deposition film, or paper is used.

The protective material 110 provided in a region surrounded by the exterior body of the power storage unit can ensure a margin that allows a tab portion and a positive electrode lead to move in a space between two protective materials as illustrated in FIG. 1B. FIG. 1B is a schematic cross-sectional view along A1-A2 in FIG. 1A. Although three combinations of the positive electrode 101, the separator 103, and the negative electrode 102 are illustrated in FIG. 1B, one embodiment of the present invention is not particularly limited; four or more combinations are preferably provided to increase capacity. As the number of combinations is increased, the thickness of a portion where the positive electrode lead 104 and the positive electrode 101 are bonded by ultrasonic bonding increases, and a level difference is generated between a portion overlapping with the separator and the ultrasonic bonding portion. Thus, bending the power storage unit might easily cause a crack at a thin portion of the electrode. When the protective materials 110a and 110b reduce the level difference, the power storage unit 100 can be durable.

The protective material 110 may be provided so that a region shown by chain lines in FIG. 1A is harder to be bent than the other region when the power storage unit is bent so as to have a desired shape. A restricting function of preventing the secondary battery from being bent more than necessary may be provided.

When the power storage unit is bent so as to have a desired shape, the protective material may also be bent into a desired shape, contributing to maintaining of the bent shape of the power storage unit. By providing the protective material 110 in a region surrounded by the exterior body of the power storage unit, the influence of a strain caused by externally applying force to the power storage unit can be reduced to be acceptable. Thus, the power storage unit can have high reliability.

Here, a current flow in charging a secondary battery will be described with reference to FIG. 1C. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 1C:
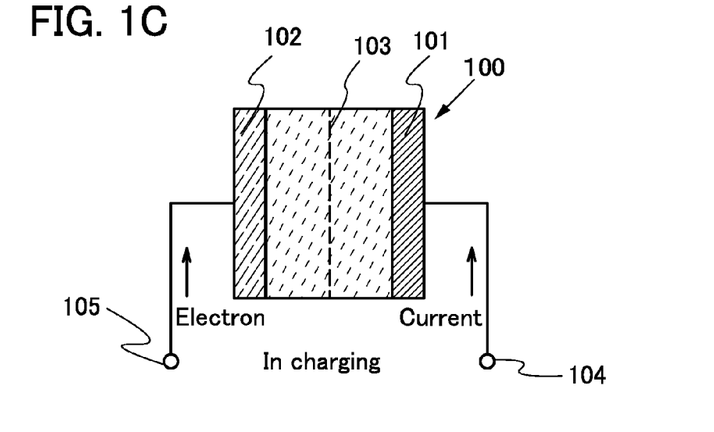

Two terminals in FIG. 1C are connected to a charger, and the power storage unit 100 is charged. As the charge of the power storage unit 100 proceeds, a potential difference between electrodes increases. The positive direction in FIG. 1C is the direction in which a current flows from one terminal (positive electrode lead 104) outside the power storage unit 100 to a positive electrode current collector (positive electrode 101), and flows from the positive electrode 101 to the negative electrode 102 and from the negative electrode to the other terminal (negative electrode lead 105) outside the power storage unit 100 in the power storage unit 100. In other words, a current flows in the direction of a flow of a charging current.

Note that a film serving as the exterior body 107 is not illustrated in FIG. 1B for simplicity of explanation in this embodiment. Actually, facing portions of an adhesive layer of the film are in contact with each other at the compression bonding region 118 and portions of the sealing layers 115, whereby sealing is achieved.

Figure 2A:
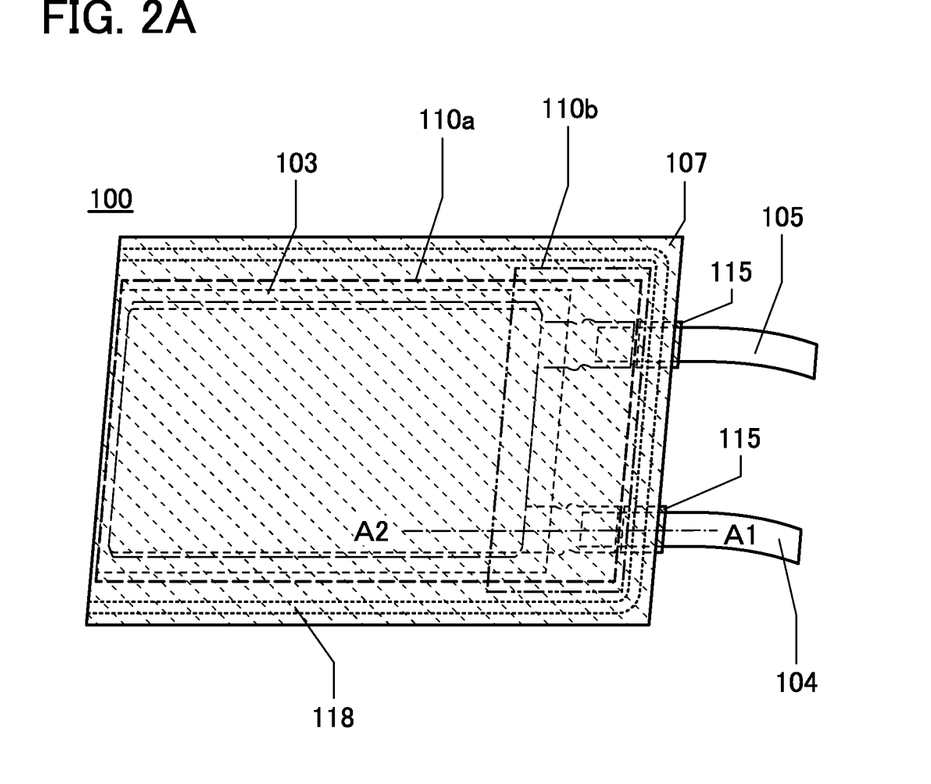
FIGS. 2A and 2B are a perspective view and a cross-sectional view illustrating a structural example of a region surrounded by an external body of one embodiment of the present invention.
Figure 2B:
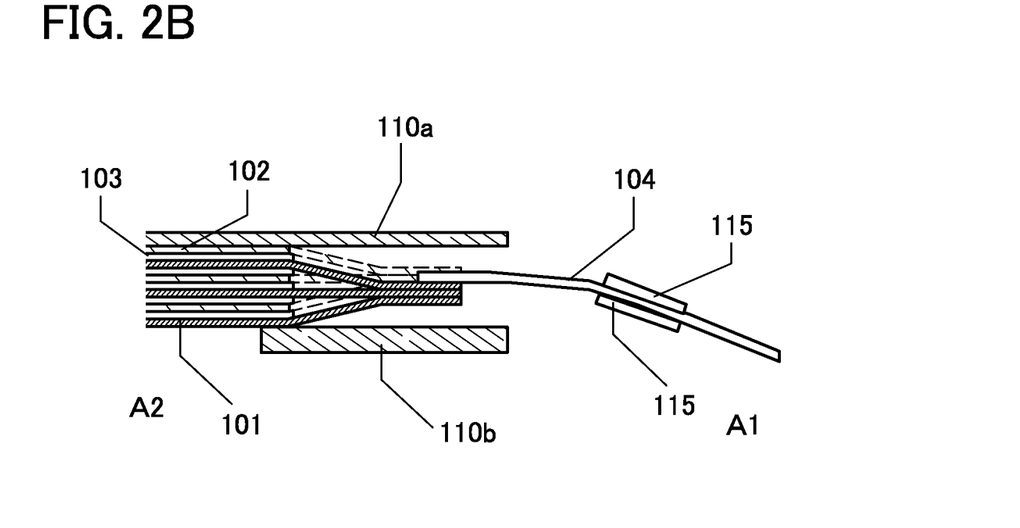

Although FIGS. 1A and 1B illustrate an example where two protective materials 110 with approximately the same size are used, one embodiment of the present invention is not particularly limited to this example. For example, two protective materials with different areas may be used as illustrated in FIG. 2A. FIG. 2B is a cross-sectional view along A1-A2 in FIG. 2A. The thickness of the protective material 110a with a larger area may be smaller than that of the protective material 110b with a smaller area as illustrated in FIG. 2B.

Examples of materials for forming the separator 103 include porous insulators such as cellulose, polypropylene (PP), polyethylene (PE), polybutene, nylon, polyester, polysulfone, polyacrylonitrile, polyvinylidene fluoride, and tetrafluoroethylene. Alternatively, nonwoven fabric of a glass fiber or the like, or a diaphragm in which a glass fiber and a polymer fiber are mixed can be used.

In this embodiment, the structure of the power storage unit is as follows, for example: the thickness of the separator 103 is approximately 15 μm to 30 μm; the thickness of a current corrector in the positive electrode 101 is approximately 10 μm to 40 μm; the thickness of a positive electrode active material layer is approximately 50 μm to 100 μm; the thickness of a negative electrode active material layer is approximately 50 μm to 100 μm; and the thickness of a current corrector in the negative electrode 102 is approximately 5 μm to 40 μm.

Although a sheet-like separator may be used as the separator 103 in FIG. 2A, a bag-like one may alternatively be used. Furthermore, one separator may be bent and provided in the exterior body 107 such that the positive electrode (or the negative electrode) is located between facing surfaces of the bent separator.

Examples of positive electrode active materials that can be used for the positive electrode active material layer in the power storage unit 100 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

Alternatively, a complex material such as $Li_{(2-j)}MSiO_4$ (general formula) (M is one or more of Fe(II), Mn(II), Co(II), and Ni(II); $0\leq j\leq 2$) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_s$-$Co_tMn_uSiO_4$ ($r+s+t+u \leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 103, an insulator such as cellulose (paper), polypropylene with pores, or polyethylene with pores can be used.

As an electrolyte of the electrolytic solution, a material that has carrier ion mobility and contains lithium ions as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolytic solution, a material with carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a fluorine-based polymer gel, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material used in the negative electrode active material layer in the power storage unit 100; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as the alloy-based material, for example. Such elements have higher capacity than carbon. In particular, silicon has a significantly high theoretical capacity of 4200 mAh/g. For this reason, silicon is preferably used as the negative electrode active material. Examples of the alloy-based material that uses such an element include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, SiO, SnO, $SnO_2$, or an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer may further include a binder for increasing adhesion of active materials, a conductive additive for increasing the conductivity of the negative electrode active material layer, and the like in addition to the above negative electrode active materials.

The protective material is not necessarily provided in the region surrounded by the exterior body, and may be provided so as to be partly exposed. In bonding outer edges of the exterior body 107 by thermocompression bonding, thermocompression bonding may be performed for sealing with a bonding region and part of the protective material overlapping with each other. In that case, the protective material is fixed in a portion in contact with the bonding region.

Although an example of a small battery used in a portable information terminal or the like is described in this embodiment, one embodiment of the present invention is not particularly limited to this example. Application to a large battery provided in a vehicle or the like is also possible.

Embodiment 2

In this embodiment, unevenness is formed on a film serving as an exterior body by pressing, e.g., embossing, and a sheet-like plastic film is used as the protective material 110 in a region surrounded by the exterior body. One protective material 110 is used in this embodiment.

In this embodiment, an example of fabricating a lithium-ion secondary battery with the use of a film whose surface is embossed with a pattern will be described with reference to FIGS. 3A to 3D. Note that in FIGS. 3A to 3D, the same reference numerals are used for the same parts as those in FIGS. 1A to 1C, and detailed description of the parts is omitted here for simplicity.

First, a sheet made of a flexible material is prepared. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. This sheet is cut to obtain a film.

Then, the film is embossed to form unevenness so that the pattern can be visually recognized. Although an example where the sheet is cut and then embossing is performed is described here, the order is not particularly limited; embossing may be performed before cutting the sheet and then the sheet may be cut. Alternatively, the sheet may be cut after thermocompression bonding is performed with the sheet bent.

Note that embossing refers to processing for forming unevenness on a surface of a film by bringing an embossing roll whose surface has unevenness into contact with the film with pressure. The embossing roll is a roll whose surface is patterned.

The embossing roll is not necessarily used, and an embossing plate may be used. Furthermore, embossing is not necessarily employed, and any method that allows formation of a relief on part of the film is employed.

In this embodiment, both surfaces of a film 411 are provided with unevenness to have patterns, and the film 411 is folded in half so that two end portions each including two of the four corners overlap with each other, and is sealed on three sides with an adhesive layer.

Figures 3A, 3B, 3C, 3D:
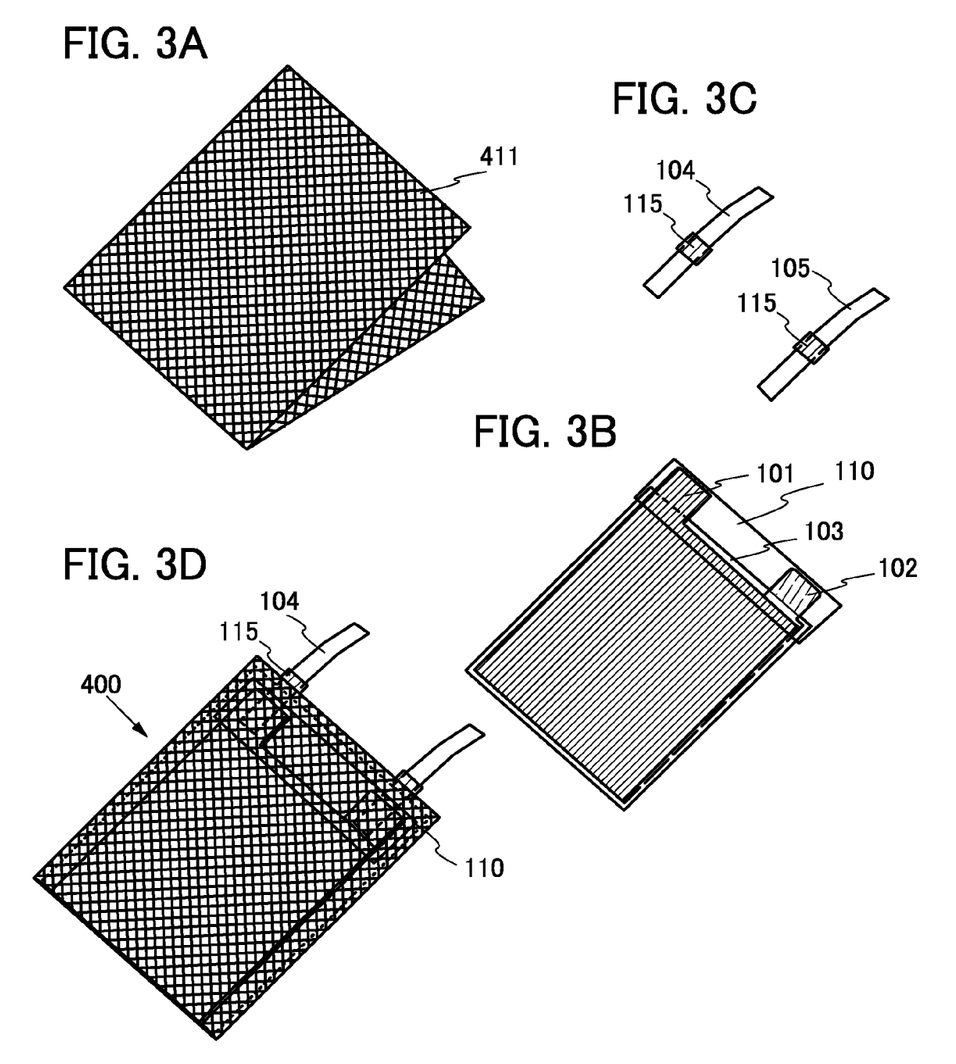
FIGS. 3A to 3D are schematic external views illustrating a structural example of one embodiment of the present invention.

Then, the film 411 is folded in half, whereby a state illustrated in FIG. 3A is produced.

The positive electrode 101, the separator 103, and the negative electrode 102 that are stacked and included in a secondary battery as illustrated in FIG. 3B and the protective material 110 are prepared. Current collectors used in the positive electrode 101 and the negative electrode 102 can each be formed using a highly conductive material that is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 40 μm inclusive. Note that the example where one combination of the positive electrode 101, the separator 103, and the negative electrode 102 that are stacked is packed in an exterior body is illustrated here for simplicity. To increase the capacity of a secondary battery, a plurality of combinations may be stacked and packed in an exterior body. In this embodiment, 12 combinations are stacked and packed in an exterior body.

In addition, two lead electrodes with the sealing layers 115 illustrated in FIG. 3C are prepared. The lead electrodes are each also referred to as a lead terminal and provided in order to lead a positive electrode or a negative electrode of a secondary battery to the outside of an exterior film.

Aluminum and nickel-plated copper are used as the positive electrode lead 104 and the negative electrode lead 105, respectively.

Then, the positive electrode lead 104 is electrically connected to a protruding portion of the positive electrode 101 by ultrasonic welding or the like. The negative electrode lead 105 is electrically connected to a protruding portion of the negative electrode 102 by ultrasonic welding or the like.

Then, two sides of the film 411 are sealed by thermocompression bonding, and one side is left open for introduction of an electrolytic solution. In thermocompression bonding, the sealing layers 115 provided on the lead electrodes are also melted, thereby fixing the lead electrodes and the film 411 to each other. After that, in a reduced-pressure atmosphere or an inert atmosphere, a desired amount of electrolytic solution is introduced to the inside of the film 411 in the form of a bag. Lastly, the outer edge of the film that has not been subjected to thermocompression bonding and is left open is sealed by thermocompression bonding.

In this manner, a power storage unit 400 illustrated in FIG. 3D can be fabricated.

In the obtained power storage unit 400, the surface of the film 411 serving as an exterior body has a pattern including unevenness. An edge region is a thermocompression-bonded region. A surface of the thermocompression-bonded region also has a pattern including unevenness. Although the unevenness in the thermocompression-bonded region is smaller than that in a center portion, it can relieve stress applied when the secondary battery is bent. Such a structure as can relieve a strain caused by stress can prevent the secondary battery (e.g., an exterior body) from being damaged when changed in form by being bent, for example, achieving long-time reliability.

Moreover, the obtained power storage unit 400 includes a region easy to bend that is formed by embossing and a region difficult to bend in which the protective material 110 is provided. A portion with a small width of the current collector is positioned in the region difficult to bend, whereby the protective material 110 can reduce damage to the current collector.

This embodiment can be freely combined with Embodiment 1.

Embodiment 3

In this embodiment, examples of electronic devices each incorporating the power storage unit obtained using Embodiment 1 or 2 will be described.

Examples of electronic devices each using a power storage unit are as follows: display devices (also referred to as televisions or television receivers) such as head-mounted displays and goggle type displays, desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

The power storage unit fabricated according to any of Embodiments 1 to 3 includes, as an exterior body, a thin film having flexibility and thus can be bonded to a support structure body with a curved surface and can change its form reflecting the curved surface of a region of the support structure body that has a large radius of curvature.

In addition, a flexible power storage unit can be incorporated along a curved inside/outside wall surface of a house or a building or a curved interior/exterior surface of an automobile.

Figure 4A:
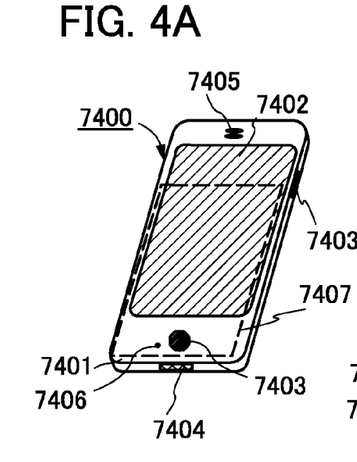
FIGS. 4A to 4H are external perspective views illustrating electronic devices of embodiments of the present invention.

FIG. 4A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage unit 7407.

Figures 4B, 4C:
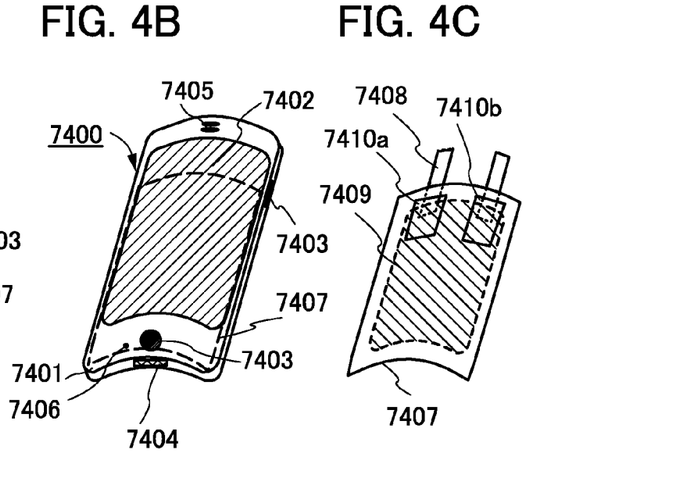

FIG. 4B illustrates the mobile phone 7400 that is bent. When the whole mobile phone 7400 is bent by external force, the power storage unit 7407 included in the mobile phone 7400 is also bent. FIG. 4C illustrates the bent power storage unit 7407. The power storage unit 7407 is a laminated storage battery (also referred to as a layered battery or a film-covered battery). The power storage unit 7407 is fixed while being bent. Note that the power storage unit 7407 includes a lead electrode 7408 electrically connected to a current collector 7409. For example, protective materials 7410*a* and 7410*b* are provided in a region surrounded by a film serving as an exterior body of the power storage unit 7407, so that the power storage unit 7407 has high reliability even when bent. The mobile phone 7400 may further be provided with a slot for insertion of a SIM card, a connector portion for connecting a USB device such as a USB memory.

Figure 4D:
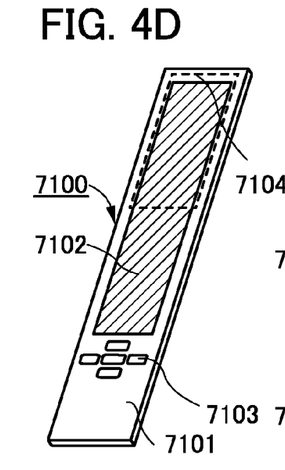
Figures 4E, 4F:
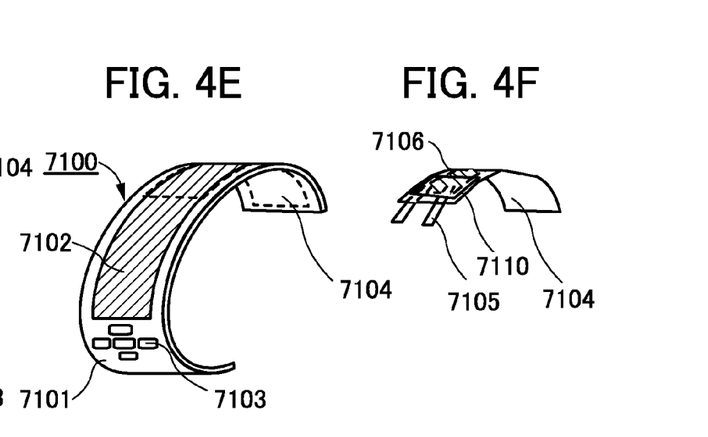

FIG. 4D illustrates an example of a mobile phone that can be bent. When bent to be put around a forearm, the mobile phone can be used as a bangle-type mobile phone as in FIG. 4E. A mobile phone 7100 includes a housing 7101, a display portion 7102, an operation button 7103, and a power storage unit 7104. FIG. 4F illustrates the power storage unit 7104 that can be bent. When the mobile phone is worn on a user's arm while the power storage unit 7104 is bent, the housing changes its form and the curvature of a part or the whole of the power storage unit 7104 is changed. Specifically, a part or the whole of the housing or the main surface of the power storage unit 7104 is changed in the range of radius of curvature from 10 mm to 150 mm. Note that the power storage unit 7104 includes a lead electrode 7105 that is electrically connected to a current collector 7106. For example, a protective material 7110 is provided in a region surrounded by a film serving as an exterior body of the power storage unit 7104, so that the power storage unit 7104 can retain high reliability even when the power storage unit 7104 is bent many times with different curvatures. As described above, the mobile phone illustrated in FIG. 4D can be changed in form in more than one way, and it is desirable that at least the housing 7101, the display portion 7102, and the power storage unit 7104 have flexibility in order to change the form of the mobile phone.

The mobile phone 7100 may further be provided with a slot for insertion of a SIM card, a connector portion for connecting a USB device such as a USB memory.

Figure 4G:
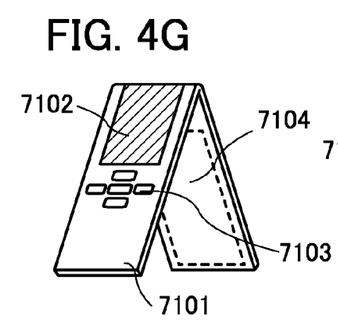
Figure 4H:
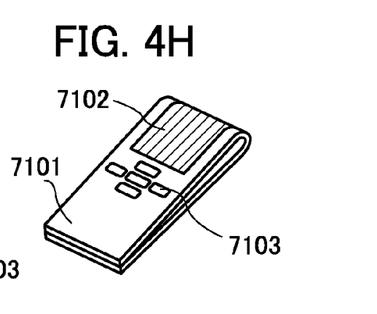

As for another usage example of the mobile phone, when a center portion of the mobile phone illustrated in FIG. 4D is bent, a form illustrated in FIG. 4G can be obtained. When a center portion of the mobile phone is folded so that end portions of the mobile phone overlap with each other as illustrated in FIG. 4H, the mobile phone can be reduced in size so as to be put in, for example, a pocket of clothes a user wears. In the cases of only changes in form illustrated in FIGS. 4D, 4G, and 4H, the power storage unit 7104 is not being bent. When a mobile phone that is thin falls or has any other impact, the power storage unit 7104 provided therein is also shocked. A protective material that is provided in a region surrounded by a film serving as an exterior body of the power storage unit 7104 relieves such an impact, and the use of the protective material enables fabrication of a durable secondary battery. Thus, the use of the power storage unit 7104 provided with a protective material in a region surrounded by a film serving as an exterior body allows fabrication of a mobile phone that is highly reliable regardless of whether the mobile phone is bent or not.

The use of power storage units that can be bent in vehicles enables production of next-generation clean energy vehicles such as hybrid electric vehicles (HEVs), electric vehicles (EVs), and plug-in hybrid electric vehicles (PHEVs). Moreover, power storage units that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

EXPLANATION OF REFERENCE

100: power storage unit, 101: positive electrode, 102: negative electrode, 103: separator, 104: positive electrode lead, 105: negative electrode lead, 107: exterior body, 110: protective material, 110*a*: protective material, 110*b*: protective material, 115: sealing layer, 118: compression bonding region, 400: power storage unit, 411: film, 1700: curved surface, 1701: plane, 1702: curve, 1703: radius of curvature, 1704: center of curvature, 1800: center of curvature, and 1801: film This application is based on Japanese Patent Application serial no. 2014-102895 filed with Japan Patent Office on May 16, 2014, the entire contents of which are hereby incorporated by reference.

The invention claimed is:

1. A secondary battery comprising:
    a first current collector;
    a first active material layer;
    a second current collector;
    a second active material layer;
    a protective material; and
    a film surrounding the first current collector, the first active material layer, the second current collector, the second active material layer, and the protective material,
    wherein the first current collector and the second current collector partly overlap with each other in a first direction,
    wherein the first current collector and the protective material partly overlap with each other in the first direction,
    wherein the first current collector includes a first region in contact with the first active material layer, and a second region projecting from an end face of the first active material layer in a second direction,
    wherein the second direction is perpendicular to the first direction,
    wherein the second current collector includes a third region in contact with the second active material layer, and a fourth region projecting from an end face of the second active material layer in the second direction, and
    wherein the protective material overlaps with each of the first region and the second region in the first direction.

2. The secondary battery according to claim 1, wherein the protective material overlaps with the fourth region in the first direction.

3. The secondary battery according to claim 1, wherein the protective material partly overlaps with the first active material layer in the first direction.

4. The secondary battery according to claim 1, wherein the protective material partly overlaps with the second active material layer in the first direction.

5. An electronic device comprising:
    the secondary battery according to claim 1; and
    at least one of a display portion, a housing, a speaker, a microphone, and an operation button.

6. A secondary battery comprising:
    a first current collector;
    a first active material layer;
    a second current collector;
    a second active material layer;
    a first protective material;
    a second protective material; and
    a film surrounding the first current collector, the first active material layer, the second current collector, the second active material layer, the first protective material, and the second protective material,
    wherein the first current collector and the second current collector partly overlap with each other in a first direction, and
    wherein the first protective material and the second protective material partly overlap with each other in the first direction.

7. The secondary battery according to claim 6,
    wherein the first current collector includes a first region in contact with the first active material layer, and a second region projecting from an end face of the first active material layer in a second direction,
    wherein the second direction is perpendicular to the first direction,
    wherein the second current collector includes a third region in contact with the second active material layer, and a fourth region projecting from an end face of the second active material layer in the second direction, and
    wherein the second region is located between the first protective material and the second protective material.

8. The secondary battery according to claim 7, wherein the first protective material overlaps with a boundary between the first region and the second region in the first direction.

9. The secondary battery according to claim 7, wherein the first protective material overlaps with a boundary between the third region and the fourth region in the first direction.

10. An electronic device comprising:
   the secondary battery according to claim 6; and
   at least one of a display portion, a housing, a speaker, a microphone, and an operation button.

* * * * *